(12) United States Patent
Joo et al.

(10) Patent No.: US 10,791,155 B2
(45) Date of Patent: Sep. 29, 2020

(54) INFRASTRUCTURE APPARATUS AND METHOD OF PROVIDING COLLABORATION BETWEEN THING DEVICES

(71) Applicant: Electronics and Telecommunications Research Institute, Daejeon (KR)

(72) Inventors: Seong Soon Joo, Daejeon (KR); Jong Arm Jun, Daejeon (KR); Cheol Sig Pyo, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 15/874,097

(22) Filed: Jan. 18, 2018

(65) Prior Publication Data
US 2018/0205770 A1    Jul. 19, 2018

(30) Foreign Application Priority Data

Jan. 18, 2017 (KR) .................. 10-2017-0008628
Jan. 11, 2018 (KR) .................. 10-2018-0004011

(51) Int. Cl.
*H04L 29/06* (2006.01)
*H04L 29/08* (2006.01)
(Continued)

(52) U.S. Cl.
CPC ............ *H04L 65/403* (2013.01); *G06F 9/50* (2013.01); *G06F 16/00* (2019.01); *G06Q 10/06* (2013.01);
(Continued)

(58) Field of Classification Search
CPC . H04W 4/21; G06F 16/00; G06F 9/50; G06Q 10/06; G06Q 50/01; H04L 65/1059
(Continued)

(56) References Cited

U.S. PATENT DOCUMENTS

| 8,640,137 B1* | 1/2014 | Bostic | G06F 9/5072 |
| | | | 718/104 |
| 2001/0013055 A1* | 8/2001 | Kojima | G06F 9/505 |
| | | | 709/205 |

(Continued)

FOREIGN PATENT DOCUMENTS

KR    10-1437329    9/2014

OTHER PUBLICATIONS

Seong-Soon Joo, "Thing-User Customized Service and Thing-User Centric Networks"; ISO/IEC JTC1/SC6, Jun. 19-Jun. 23, 2017.
(Continued)

*Primary Examiner* — Meng Vang
(74) *Attorney, Agent, or Firm* — Kile Park Reed & Houtteman PLLC

(57) ABSTRACT

Provided are an infrastructure apparatus and method of providing collaboration between thing devices. Since a plurality of thing devices located in a specific space share an experience where the plurality of thing devices have performed a collaboration service, each of the thing devices may search for peripheral thing devices for performing the collaboration service without intervention of a center server and may generate a collaboration group including the found thing devices, and tasks for performing through negotiation may be autonomously distributed to the thing devices included in the collaboration group, thereby providing autonomous collaboration between the thing devices.

19 Claims, 8 Drawing Sheets

(51) Int. Cl.
*G06F 9/50* (2006.01)
*G06Q 10/06* (2012.01)
*G06Q 50/00* (2012.01)
*H04W 4/21* (2018.01)
*G06F 16/00* (2019.01)
*H04W 4/38* (2018.01)

(52) U.S. Cl.
CPC ......... *G06Q 50/01* (2013.01); *H04L 65/1059* (2013.01); *H04L 65/1069* (2013.01); *H04L 67/12* (2013.01); *H04L 67/125* (2013.01); *H04L 67/16* (2013.01); *H04L 67/2804* (2013.01); *H04W 4/21* (2018.02); *H04L 67/2819* (2013.01); *H04W 4/38* (2018.02)

(58) Field of Classification Search
USPC .......................................................... 709/205
See application file for complete search history.

(56) References Cited

U.S. PATENT DOCUMENTS

| | | | |
|---|---|---|---|
| 2005/0144234 A1* | 6/2005 | Tanaka | G06F 9/4881 709/205 |
| 2009/0327395 A1* | 12/2009 | Park | H04W 8/005 709/202 |
| 2010/0007483 A1 | 1/2010 | Oh et al. | |
| 2010/0094981 A1* | 4/2010 | Cordray | H04L 41/20 709/222 |
| 2014/0026144 A1* | 1/2014 | Pack | G06F 9/505 718/105 |
| 2014/0129643 A1 | 5/2014 | Cho et al. | |
| 2015/0358810 A1* | 12/2015 | Chao | H04W 52/0209 455/418 |

OTHER PUBLICATIONS

Seong-Soon Joo et al., "Revised Text for resolving the PDTR ballot comments on ISO/IEC TR 29181-9, Future Network: Problem Statements and Requirements—Part 9: Networking of Everything"; ISO/IEC JTC 1/SC6, Aug. 2016.

* cited by examiner

INFRASTRUCTURE APPARATUS AND METHOD OF PROVIDING COLLABORATION BETWEEN THING DEVICES

CROSS-REFERENCE TO RELATED APPLICATIONS

This application claims priority under 35 U.S.C. § 119 to Korean Patent Application No. 10-2017-0008628, filed on Jan. 18, 2017 and Korean Patent Application No. 10-2018-0004011, filed on Jan. 11, 2018, the disclosure of which is incorporated herein by reference in its entirety.

TECHNICAL FIELD

The present invention relates to infrastructure technology for providing autonomous collaboration between thing devices.

BACKGROUND

Thing devices are advancing to intelligent thing devices which have a communication function as well as a calculation function. Due to such a trend, an infrastructure for providing various mergence services through autonomous collaboration between thing devices without intervention of a user or a center server is being needed. That is, infrastructure for providing an autonomous collaboration service, where thing devices accessing a heterogeneous network as well as a homogeneous network autonomously exchanges a task, searches for and selects a thing for performing the task, and performs the task in parallel or sequentially, is needed. However, research and development for construction of the infrastructure is insufficient.

SUMMARY

Accordingly, the present invention provides an infrastructure apparatus and method of providing autonomous collaboration between thing devices without intervention of a user or a center server.

In one general aspect, a method of providing collaboration between thing devices, connected to one another over a social network, includes: interpreting, by a thing device, a collaboration service requested by a user to search for a plurality of peripheral thing devices capable of performing the collaboration service; in response to the search for the plurality of peripheral thing devices, transmitting, by at least one of the plurality of peripheral thing devices, experience information describing an experience of the at least one peripheral thing device associated with the collaboration service to the thing device; generating, by the thing device, a collaboration group including the at least one peripheral thing device, based on the experience information; allocating, by the thing device, different tasks corresponding to the collaboration service to all of thing devices included in the collaboration group, respectively; and converting, by each of the thing devices, a result of performing of an allocated task into knowledge information to store the knowledge information in a collaboration knowledge base.

In another general aspect, an infrastructure apparatus for providing collaboration between thing devices, connected to one another over a social network, includes: a thing device interpreting a collaboration service requested by a user to search for a plurality of peripheral thing devices capable of performing the collaboration service; and at least one peripheral thing device transmitting, to the thing device, experience information describing an experience of the at least one peripheral thing device associated with the collaboration service in response to the search for the plurality of peripheral thing devices, wherein the thing device generates a collaboration group including the at least one peripheral thing device, based on the experience information and respectively allocates different tasks corresponding to the collaboration service to all of thing devices included in the collaboration group, and each of the thing devices builds a collaboration knowledge base where a result of performing of an allocated task is stored as knowledge information, and includes a storage module storing the collaboration knowledge base.

Other features and aspects will be apparent from the following detailed description, the drawings, and the claims.

DETAILED DESCRIPTION OF EMBODIMENTS

Figure 1:
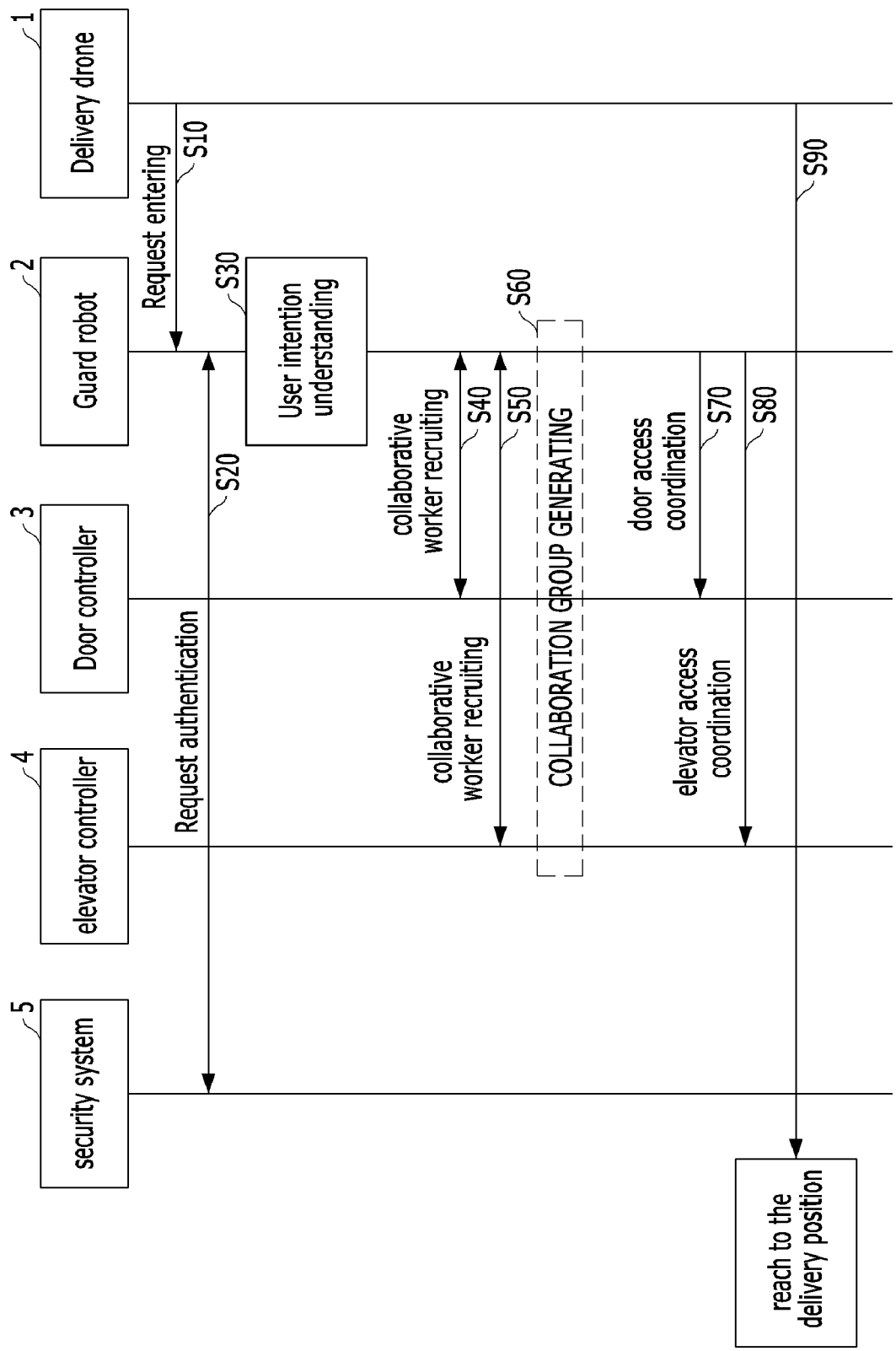
FIG. 1 is a diagram illustrating an unmanned delivery scenario to which an embodiment of the present invention is applied.

Hereinafter, embodiments of the present invention will be described in detail with reference to the accompanying drawings. Terms used herein are terms that have been selected in consideration of functions in embodiments, and the meanings of the terms may be altered according to the intent of a user or operator, or conventional practice. Therefore, the meanings of terms used in the below-described embodiments confirm to definitions when defined specifically in the specification, but when there is no detailed definition, the terms should be construed as meanings known to those skilled in the art.

The invention may have diverse modified embodiments, and thus, example embodiments are illustrated in the drawings and are described in the detailed description of the invention. However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an unmanned delivery scenario to which an infrastructure apparatus and method of providing autonomous collaboration between thing devices according to an embodiment of the present invention is applied. Such an application example is for helping understanding and does not limit an example where an embodiment of the present invention is applied to the unmanned delivery scenario.

Referring to FIG. 1, the unmanned delivery scenario to which an embodiment of the present invention is applied may be a service where a delivery drone delivers goods to a specific place in a building at which a recipient is located.

In order to apply the infrastructure apparatus and method of providing autonomous collaboration between thing devices according to an embodiment of the present invention to the unmanned delivery scenario, a delivery drone 1 may need collaboration between a plurality of thing devices in a building, which is necessary for a flight to a specific place, at which a recipient of goods is located, in the building.

In FIG. 1, a guard robot 2, a door controller 3, and an elevator controller 4 are illustrated as a plurality of thing devices for performing collaboration.

In detail, in step S10, when the delivery drone 1 reaches a building at which a recipient of goods is located, the delivery drone 1 may issue a request, to the guard robot 2, to provide a collaboration service. For example, the delivery drone 1 may request entry from the guard robot 2.

Subsequently, in step S20, in response to an entry request of the delivery drone 1, the guard robot 2 may request an authentication of the delivery drone 1 from a security system 5 in the building system.

Subsequently, when the authentication of the delivery drone 1 is completed, namely, when it is checked that the delivery drone 1 is a registered (authorized) thing device, the guard robot 2 may analyze the collaboration service requested by the delivery drone 1 to interpret (understand) an intention of a user of the delivery drone 1 in step S30.

Subsequently, in steps S40 and S50, the guard robot 2 may advertise, through a social network, recruiting of a worker capable of performing the collaboration service requested by the delivery drone 1.

Subsequently, in step S60, when a worker (for example, the door controller 3 and an elevator controller 4) for performing the collaboration service requested by the delivery drone 1 applies in repose to the advertisement for recruiting of the worker, the guard robot 2 may generate a collaboration group including the guard robot 2, the door controller 3, and the elevator controller 4.

Subsequently, in step S70, the guard robot 2 may coordinate a task for allowing the delivery drone 1 to access the door controller 3, and in step S80, the guard robot 2 may coordinate a task for allowing the delivery drone 1 to access the elevator controller 4. Also, the guard robot 2 may determine an order in which the task for allowing the delivery drone 1 to access the door controller 3 and the task for allowing the delivery drone 1 to access the elevator controller 4 are performed. That is, the guard robot 2 may perform a function of a coordinator and may act as a server. The function of the coordinator may be performed by the elevator controller 4 or the door controller 3.

Subsequently, in step S90, the delivery drone 1 may reach a delivery position at which a recipient is located, based on a collaboration service provided by the guard robot 2, the door controller 3, and the elevator controller 4 which configure the collaboration group, and the recipient may receive goods.

Figure 2:
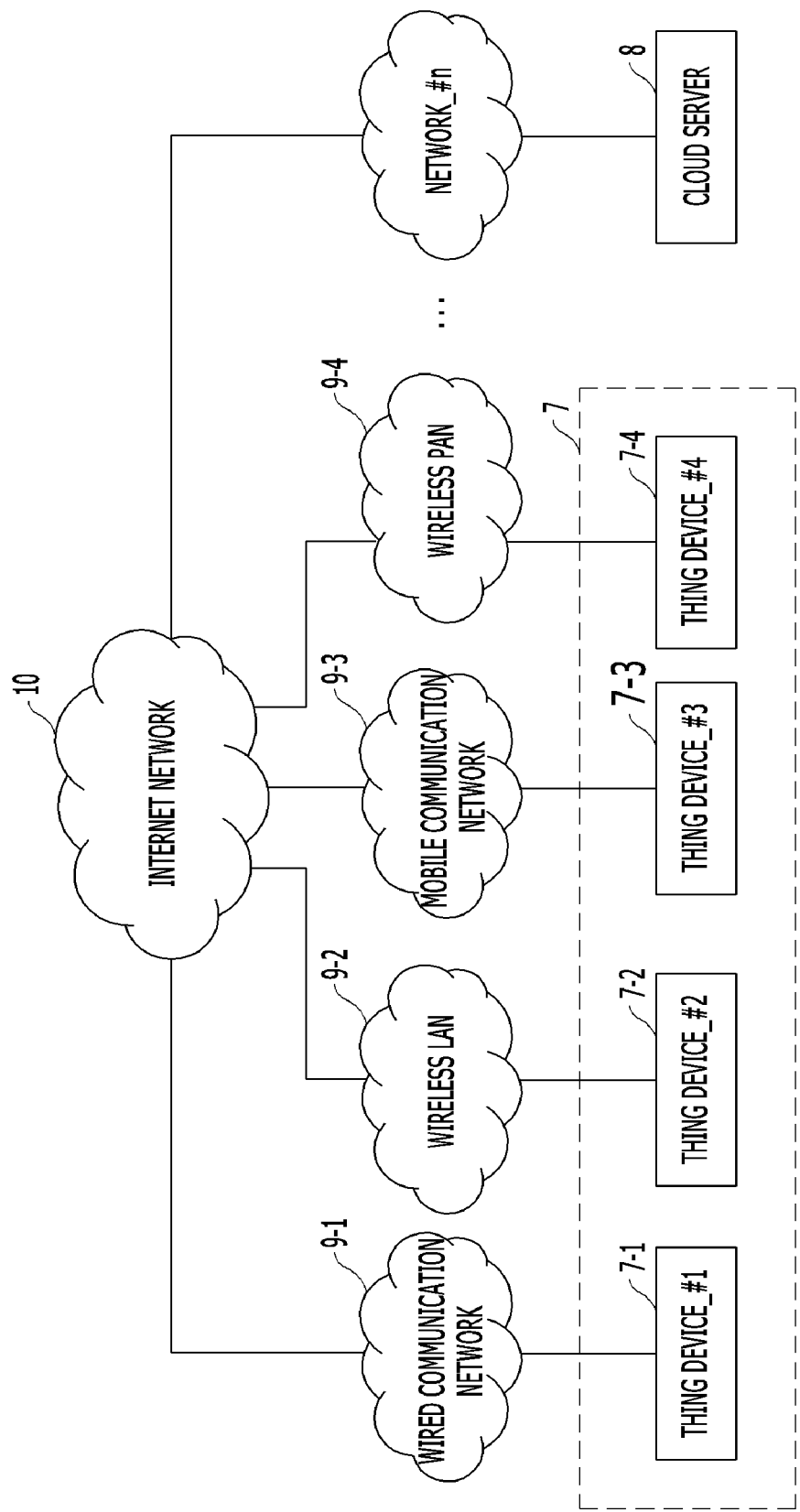
FIG. 2 is a diagram illustrating a network structure physically accessing thing devices according to an embodiment of the present invention.

FIG. 2 is a diagram illustrating a network structure physically accessing thing devices according to an embodiment of the present invention.

Referring to FIG. 2, reference numeral 7 may refer to a group (hereinafter referred to as a collaboration group) of thing devices having a collaboration relationship in a specific space such as an internal space of a building. In FIG. 2, an example where four thing devices configure a collaboration group 7 is illustrated, but more thing devices may configure the collaboration group 7 without being limited thereto.

A plurality of thing devices 7-1 to 7-4 included in the collaboration group 7 may be categorized into a fixed type and a movable type, based on an installation position and may be categorized into a data type and an intelligent type, based on an ability to perform collaboration.

Moreover, the thing devices 7-1 to 7-4 included in the collaboration group 7 may be divided based on the kind of an access network. For example, the collaboration group 7 may include the thing device 7-1 accessing a wired communication network 9-1, the thing device 7-2 accessing a wireless local area network (LAN) 9-2, the thing device 7-3 accessing a mobile communication network 9-3, and the thing device 7-4 accessing a wireless personal area network (PAN) 9-4. That is, the thing devices 7-1 to 7-4 included in the collaboration group 7 may be configured to access the different access networks 9-1 to 9-4. The different access networks 9-1 to 9-4 may be configured to access an upper network such as an Internet network 10 in common.

The thing devices 7-1 to 7-4 included in the collaboration group 7 may use a cloud server 8 which is installed at a long distance, for distributing a function of performing a collaboration service.

The collaboration group 7 may be generated by selecting thing devices capable of performing the collaboration service from among a plurality of thing devices which are found through a process of searching for thing devices located in a specific space.

In this manner, the thing devices 7-1 to 7-4 included in the collaboration group 7 may be allocated a task, based on an ability to perform the collaboration service and may configure a spatial collaboration infrastructure.

The thing devices 7-1 to 7-4 included in the collaboration group 7 may configure an overlay network. The overlay network may be a virtual network located on a portion which is upper than a physical network.

The overlay network may search for peripheral thing devices by a thing device advertising the overlay network over a network or through network search and may secure a list of the peripheral thing devices capable of providing the collaboration service.

Thing devices configuring the overlay network may sense an event caused by a situation change of a physical/logical network to autonomously configure a collaboration group between the thing devices.

Each of the thing devices configuring the overlay network may provide (or advertise) an experience (an experience of performing the collaboration service) thereof to peripheral thing devices and may configure a social network for sharing the experience. The social network may have a distributed sematic social network (DSSN) which enables all of thing devices configuring a collaboration group to perform a function of a server.

Figure 3:
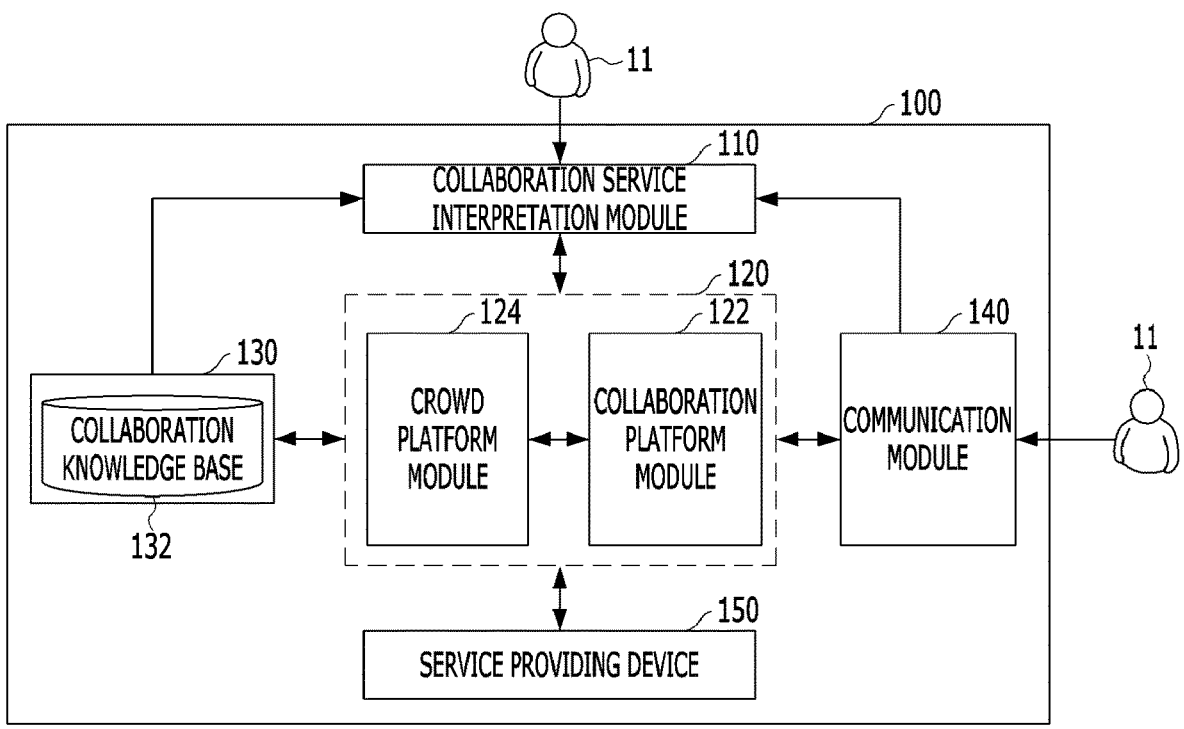
FIG. 3 is a block diagram of a thing device for providing a collaboration service according to an embodiment of the present invention.

FIG. 3 is a block diagram of a thing device 100 for providing a collaboration service according to an embodiment of the present invention.

Referring to FIG. 3, the thing device 100 may include a collaboration service interpretation module 110, a processor module 120, a storage module 130, a communication module 140, and a service providing device 150.

Collaboration Service Interpretation Module 110

The collaboration service interpretation module 110 may be a module which performs an interface function between a user 11 and the thing device 100 and may receive collaboration service request data which is directly input from the user 11 or is received through the communication module 140 from the user 11 located at a long distance. Here, the user 11 may denote a human user, a thing user, or a peripheral thing device.

The collaboration service interpretation module 110 may interpret the collaboration service request data to recognize a target of a collaboration service requested by the user 11 and may subdivide the collaboration service requested by the user 11 into a plurality of tasks so as to achieve the recognized target.

In order to subdivide the collaboration service into the plurality of tasks, the collaboration service interpretation module 110 may interpret the collaboration service request data, based on a collaboration knowledge base 132 stored in the storage module 130.

Figure 4:
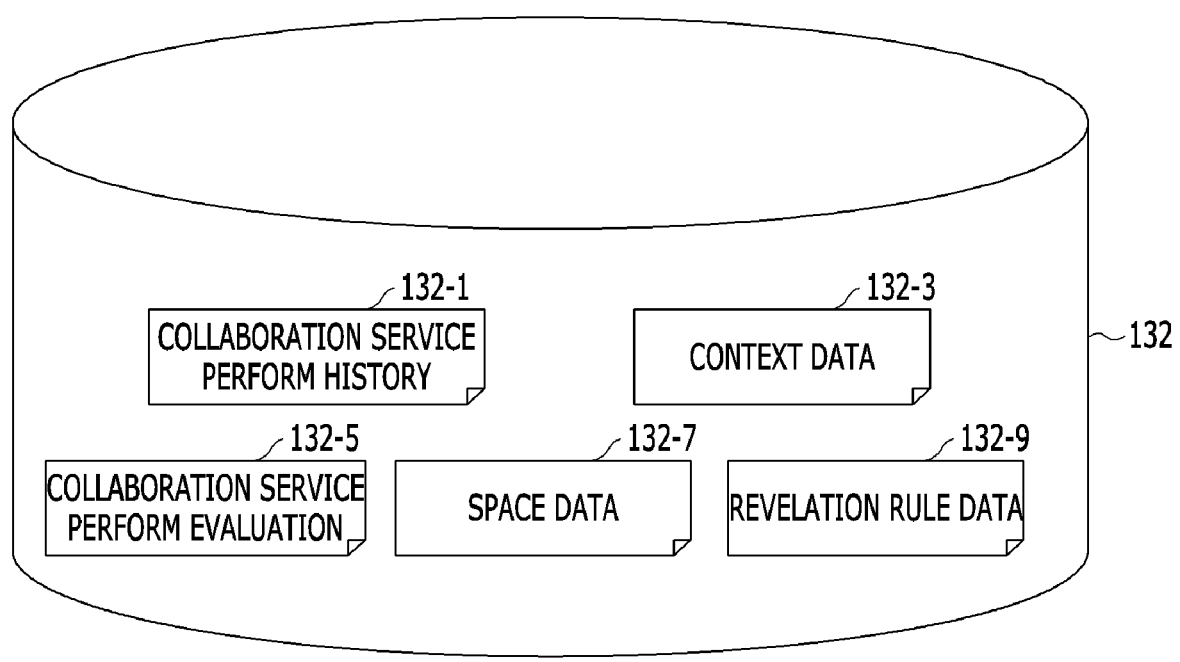
FIG. 4 is a diagram schematically illustrating knowledge information stored in a collaboration knowledge base illustrated in FIG. 3.

An example of knowledge information included in the collaboration knowledge base 132 is illustrated in FIG. 4.

Referring to FIG. 4, the collaboration knowledge base 132 may include knowledge information associated with collaboration between thing devices and may include a history 132-1 of a collaboration service which has been performed between the thing device 100 and another thing device, context data 132-3 of the thing device 100 and the other thing device, a collaboration service perform evaluation 132-5 for the collaboration service which has been performed between the thing device 100 and the other thing device, space data 132-7 of a space where the thing device 100 and the other thing device are located, and revelation rule data 132-9 which limits revelation of information of the thing device 100 to the other thing device. Here, the context data 132-3 may include, for example, a name of a thing device and a hardware or software performance specification (for example, performance, a memory, a function, etc.) which the thing device retains. The space data 132-7 may be, for example, data associated with a name of a space, an identification (ID) of the space, a physical position of the space, a scope which enables the thing device to observe an event, a use of the space, a possessor of the space, a manager of the space, and a user classification of the space. Data associated with the use of the space may be, for example, data for explaining whether the space is used as a restaurant, whether the space is used as a theatre, and whether the space is used as a meeting room.

The collaboration service request data directly input from the user 11 may be text data or sound data. If the collaboration service request data is the text data, the collaboration service interpretation module 110 may be configured to include hardware such as a keyboard, a mouse, and a touch input means and may recognize text data corresponding to a collaboration service request. If the collaboration service request data is the sound data, the collaboration service interpretation module 110 may be configured to include a microphone which collects a voice of a user and a sound recognition module which recognizes the voice collected by the microphone and converts the voice into text data, and may recognize text data corresponding to a collaboration service request.

The collaboration platform module 124 may integrate results obtained by performing a collaboration service and may provide the integrated results to the collaboration service interpretation module 110, and the collaboration service interpretation module 110 may report the results, obtained by performing the collaboration service, to the user 11.

Processor Module 120

The processor module 120 may recruit thing devices located in a specific space having a function of performing a plurality of collaboration services according to a plurality of collaboration service requests received from the collaboration service interpretation module 110 and may perform a process of generating a collaboration group including the recruited thing devices. When the process is performed, the thing device 100 may perform a function of a coordinator. On the other hand, the processor module 120 may perform a process which participates in a collaboration group configured by other thing devices.

To this end, the processor module 120 may include a collaboration platform module 122 and a crowd platform module 124.

The collaboration platform module 122 may perform a series of process which searches for a thing device capable of performing a plurality of collaboration services, generates a collaboration group, and allocates a task to thing devices included in the collaboration group.

The crowd platform module 124 may perform a series of process where the thing device 100 manages other thing devices and pieces of information provided to the other thing devices so as to participate in a collaboration group configured by the other thing devices. The pieces of information provided from the thing device 100 to the other thing devices may be information including an experience where the thing device 100 has performed a collaboration service according to a function of the thing device 100, and examples of the pieces of information may include the collaboration service perform history 132-1 and the collaboration service perform evaluation 132-5 included in the collaboration knowledge base 132 illustrated in FIG. 4.

The crowd platform module 124 may perform a series of process which manages the context data 132-3, including a hardware or software performance specification (for example, performance, a memory, a function, etc.) which the thing device 100 retains, and space data of a space where the thing device 100 is located, in addition to information including an experience of the thing device 100.

The processor module 120 including the collaboration platform module 122 and the crowd platform module 124 may be implemented with at least one pieces of hardware such as a general-use processor, a microprocessor, an application-specific integrated circuit, a digital signal processor (DSP), a programmable logic circuit, and/or the like.

The collaboration platform module 122 and the crowd platform module 124 will be described below in detail.

Storage Module 130

The storage module 130 may be a module which stores the above-described collaboration knowledge base 132, and may store various programs, algorithms, and application programming instructions, in addition to the collaboration knowledge base 132. The storage module 130 may include read-only memory (ROM), random access memory (RAM), electrical erasable programmable read only memory (EE-PROM), flash card, hard disk, and/or the like.

Communication Module 140

The communication module 140 may be a module which has an addressable interface (for example, Internet protocol (IP) address, a Bluetooth identifier, and a near field communication (NFC) ID) and transmits or receives information to or from one or more other thing devices through a wired or wireless connection.

The communication module 140 may include at least one of a passive communication interface and an active communication interface. The passive communication interface may include a quick response (QR) code, a radio frequency identification (RFID) tag, and an NFC tag. The active communication interface may include a modem, a transceiver, and a transmitter-receiver.

Service Providing Device 150

The service providing device 150 may be a device which provides a physical function corresponding to a collaboration service requested by the user 11 according to control by the processor module 120. Examples of the physical function may include, for example, a thing and environment recognition function, a walk function, a visitor response function, an invader sensing function, an object movement function, and a function of recognizing all kinds of events occurring in a specific space.

The service providing device 150 may be configured to include a sensor and an actuator, for providing the physical function. Examples of the sensor may include a camera for monitoring the inside of a space, a temperature sensor, a humidity sensor, an optical sensor, a pressure sensor, a flow sensor, a magnetic sensor, and a sound sensor. The actuator may include, for example, all kinds of driving means for physically moving an arbitrary object or changing a physical state by using power (for example, an electronic power or a fluid power) like a valve, a motor, a switch, and a lamp.

Figure 5:
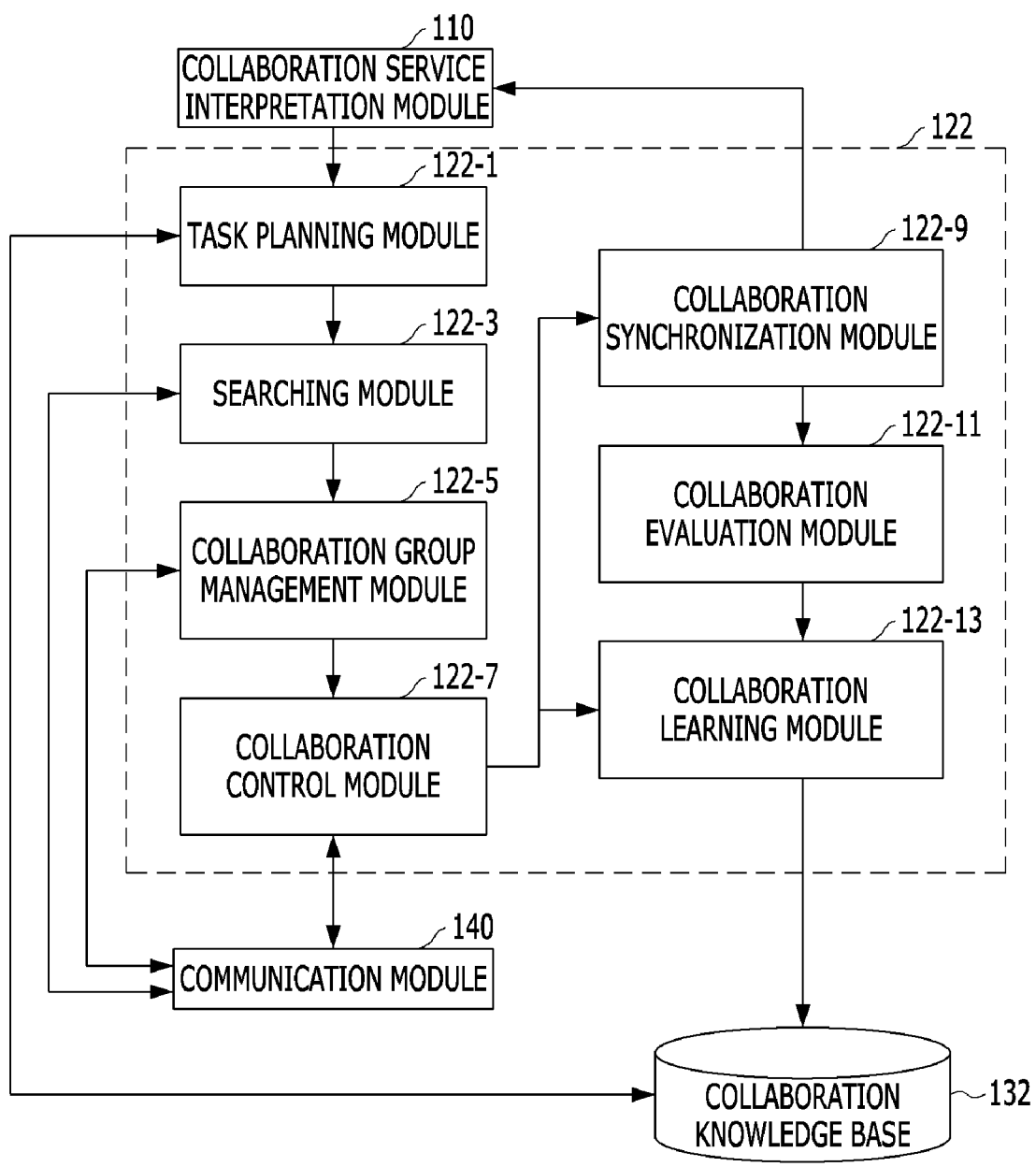
FIG. 5 is a block diagram of a collaboration platform module illustrated in FIG. 3.

FIG. 5 is a block diagram of the collaboration platform module illustrated in FIG. 3.

Referring to FIG. 5, the collaboration platform module 122 may include a task planning module 122-1, a searching module 122-3, a collaboration group management module 122-5, a collaboration control module 122-7, a collaboration synchronization module 122-9, and a collaboration learning module 22-11.

In response to a plurality of collaboration service requests input from the collaboration service interpretation module 110, the task planning module 122-1 may generate tasks respectively corresponding to collaboration services and may plan an order in which the generated tasks are performed. The task planning module 122-1 may be referred to as a task scheduler.

In order to generate the tasks respectively corresponding to the collaboration services, the task planning module 122-1 may generate a plurality of tasks necessary for performing a collaboration service, based on knowledge information (for example, the collaboration service perform history data 132-1, the context data 132-3, the collaboration service perform evaluation data 132-5, and the space data 132-7) stored in the collaboration knowledge base 132 illustrated in FIG. 3.

The searching module 122-3 may recruit peripheral thing devices capable of performing tasks planned by the task planning module 122-1.

The searching module 122-3 may perform sematic search for recruiting the peripheral thing devices. In order to perform the sematic search, the searching module 122-3 may generate a search query language which describes the tasks planned by the task planning module 122-1, an order in which the tasks are performed, the number of thing devices necessary for performing the tasks, and an advertisement for recruiting peripheral thing devices capable of performing the tasks, and may provide the generated search query language over a social network. The search query language may be at least one keyword or a sentence of a natural language type including at least one keyword.

In response to the search query language provided over the social network, the searching module 122-3 may collect, through the communication module 140, pieces of information such as experience data, context data, collaboration service perform history data, space data, and collaboration service perform evaluation data which are provided from peripheral thing devices over the social network.

The collaboration group management module 122-5 may analyze pieces of information about the peripheral thing devices collected by the searching module 122-3 to select peripheral thing devices capable of performing the tasks planned by the task planning module 122-1 from among the peripheral thing devices which have provided the pieces of information, may issue a request, to the selected peripheral thing devices, to participate in a collaboration group, and may generate the collaboration group including peripheral thing devices which have allowed the participation request.

The collaboration control module 122-7 may control an operation of the service providing device 150 so as to perform a task allocated to the thing device 100, and simultaneously, may transmit a message, issuing a request to perform the task, to the peripheral thing devices participating in the collaboration group through the communication module 140.

When all of the peripheral thing devices participating in the collaboration group complete the performing of the task, the collaboration control module 122-7 may notify the collaboration synchronization module 122-9 that all of the peripheral thing devices complete the performing of the task.

The collaboration control module 122-7 may collect a result of the performing of the task by the thing device 100 and task perform results from peripheral thing devices through the communication module 140 along with the notification and may transfer the collected task perform results to the collaboration synchronization module 122-9.

The collaboration synchronization module 122-9 may integrate and synchronize results (i.e., collaboration service perform results) of task performing which all of the peripheral thing devices participating in the collaboration group complete, and may provide the synchronized task perform results to the user 11 through the collaboration service interpretation module 110.

The collaboration evaluation module 122-11 may evaluate the collaboration service perform results of the task performing which all of the peripheral thing devices participating in the collaboration group complete. For example, the collaboration evaluation module 122-9 may check a perform time when each of thing devices performs a collaboration service, and if a perform time when a specific thing device performs the collaboration service exceeds a predetermined time, the collaboration evaluation module 122-9 may evaluate that the specific thing device does not smoothly perform an assigned collaboration service. Such an evaluation result may be reflected in a process of selecting thing devices for configuring a collaboration group. That is, the specific thing device which is evaluated as that the specific thing device does not smoothly perform the assigned collaboration service may be excluded from a collaboration group which is configured for performing the same or similar collaboration service.

The collaboration learning module 122-13 may learn a collaboration service perform evaluation result evaluated by the collaboration evaluation module 122-11 and a task perform result of task performing which all thing devices participating in a collaboration group complete, generate a result of the learning as a collaboration service perform history, and store the generated collaboration service perform history in a collaboration knowledge base to update knowledge information of the collaboration knowledge base.

Figure 6:
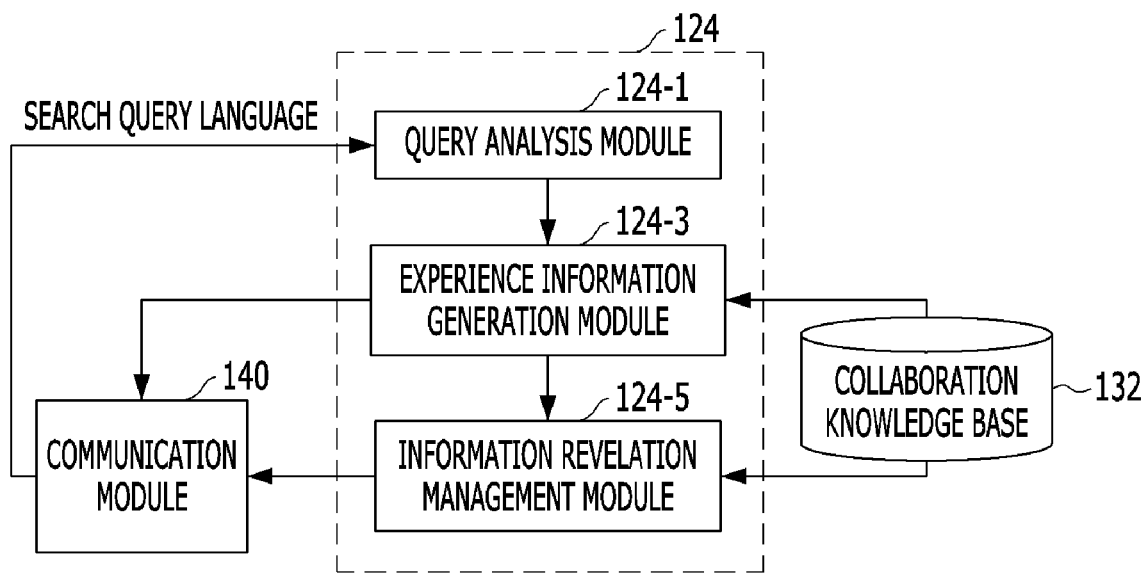
FIG. 6 is a block diagram of a crowd platform module illustrated in FIG. 3.

FIG. 6 is a block diagram of the crowd platform module illustrated in FIG. 3.

Referring to FIG. 6, the crowd platform module 124 may be referred to as a module which performs a series of process of generating experience information about a collaboration service which has been performed by the thing device 100 including the crowd platform module 124, and sharing the generated experience information with a peripheral thing device.

The crowd platform module 124 may include a query analysis module 124-1, an experience information generation module 124-3, and an information revelation management module 124-5.

The query analysis module 124-1 may receive, through the communication module 140, a search query language which is distributed to the social network by the peripheral thing device, analyze the received search query language, and recognize a recruit advertisement for recruiting thing devices necessary for performing of a collaboration service by the peripheral thing device.

The query analysis module 124-1 may use a language recognition algorithm, for analyzing the search query language. For example, the query analysis module 124-1 may parse the search query language by using the language recognition algorithm to recognize tasks requested by the peripheral thing device, an order in which the tasks are performed, and the number of thing devices necessary for performing the tasks, thereby recognizing a recruit advertisement for recruiting peripheral thing devices. The language recognition algorithm departs from the gist of the present invention, and thus, known technology is applied to a description of the language recognition algorithm.

The experience information generation module 124-3 may generate experience information, based on an analysis result of an analysis by the query analysis module 124-1. In detail, the experience information generation module 124-3 may search the collaboration knowledge base 132 to extract data associated with performance or a function capable of performing a task included in the analysis result and data associated with an experience of performing the task from the collaboration knowledge base 132 and may learn the extracted data to generate experience information.

The data associated with the performance or the function capable of performing the task may include, for example, the context data 132-3 and the space data 132-7 stored in the collaboration knowledge base 132, and data associated with the experience of performing the task may include, for example, the collaboration service perform history data 132-1 and the collaboration service perform evaluation data 132-7 stored in the collaboration knowledge base 132.

The experience information generated by the experience information generation module 124-3 may be data where a function and an experience of the thing device 100 are described with words or as a sentence. For example, the experience information may be represented as a sentence "the thing device 100 distinguishes the kind of an object and a person entering a zone A by using a video input and has a function of describing actions of the distinguished object and person" or "the thing device 100 distinguishes the kind of an object and a person entering a zone A by using a video input and has an experience of describing actions of the distinguished object and person".

The experience information generated by the experience information generation module 124-3 may extend through learning. That is, the thing device 100 does not have an experience where the thing device 100 has performed a collaboration service equal or similar to a collaboration service requested by a user, but the experience information generation module 124-3 may infer a possibility of performing the collaboration service requested by the user through learning (for example, machine learning, deep learning, or the like), based on a function of the thing device 100 and an experience where the thing device 100 has performed the collaboration service, thereby extending the experience information.

The information revelation management module 124-5 may be a module which limits a revelation of the experience information generated by the experience information generation module 124-3, and may reduce the experience information generated by the experience information generation module 124-3 according to a revelation class defined in the revelation rule data 132-9 stored in the collaboration knowledge base 132.

The revelation class may be set based on the collaboration service perform history data 132-1 and the collaboration service perform evaluation data 132-7. For example, the revelation class may be set based on a perform time of a collaboration service recorded in the collaboration service perform history data 132-1 and the number of performing fails of the collaboration service recorded in the collaboration service perform evaluation data 132-7.

When the perform time for which the collaboration service are performed exceeds a threshold time or the number of performing fails of the collaboration service exceeds threshold times, a corresponding thing device may abbreviate experience information thereof and may provide the abbreviated experience information to a peripheral thing device for configuring a collaboration group. That is, since the corresponding thing device provides the abbreviated experience information which does not sufficiently describe a function or an experience of the corresponding thing device, a peripheral thing device which recruits thing devices may analyze experience information which does not sufficiently describe a function or an experience of the peripheral thing device, and thus, may determine that the thing device providing the abbreviated experience information is not a device capable of performing the collaboration service through collaboration with the peripheral thing device, whereby the peripheral thing device may exclude the thing device from the collaboration group.

As described above, the information revelation management module 124-5 may limit a revelation of experience information according to a revelation class, and thus, a peripheral thing device which recruits thing devices may generate a collaboration group including thing devices suitable for performing the collaboration service.

Figure 7:
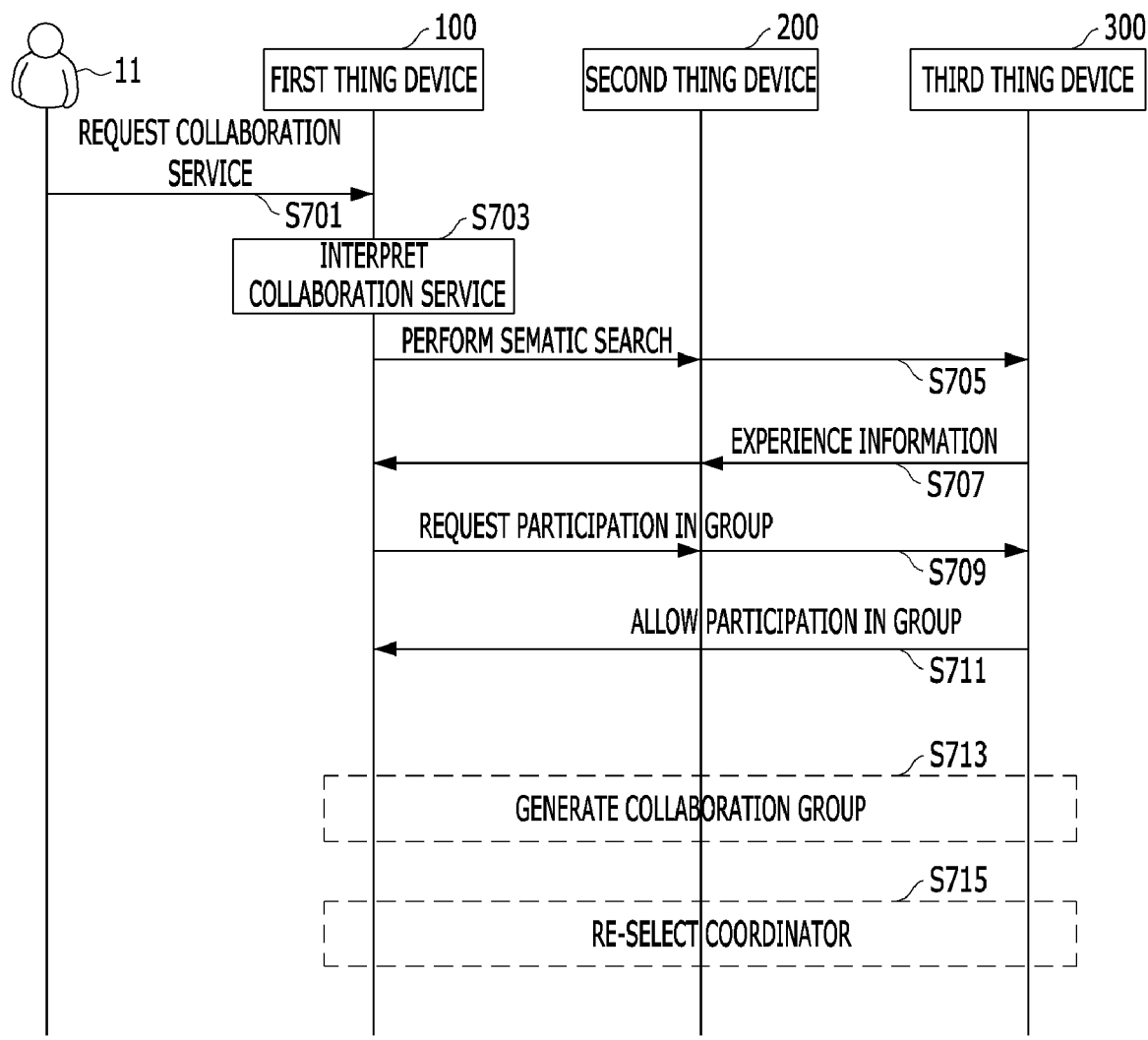
FIGS. 7 and 8 are flowcharts illustrating a method of providing collaboration between thing devices in an infrastructure apparatus according to an embodiment of the present invention.
Figure 8:
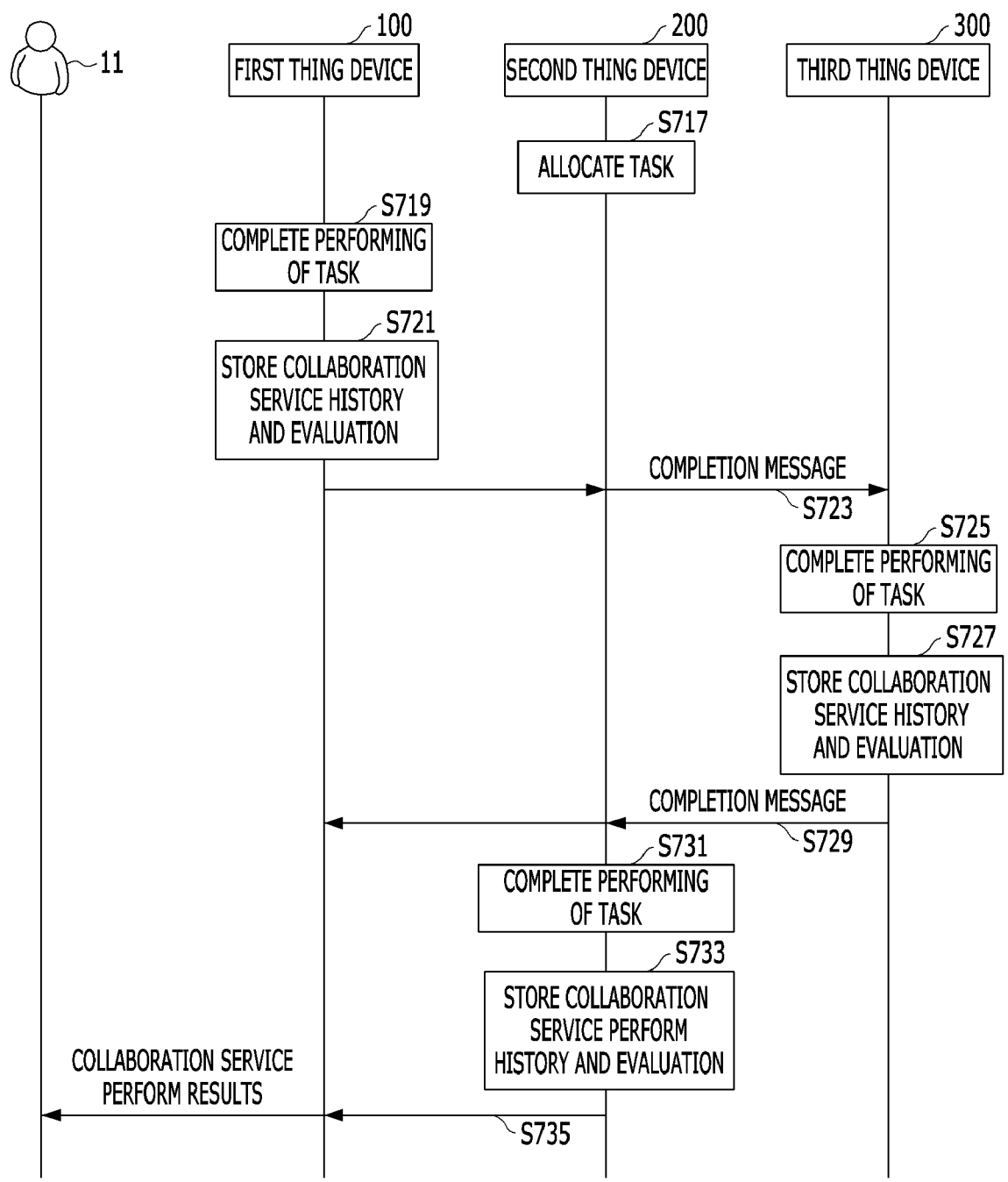

FIGS. 7 and 8 are flowcharts illustrating a method of providing collaboration between thing devices in an infrastructure apparatus according to an embodiment of the present invention.

In the infrastructure apparatus according to an embodiment illustrated in FIGS. 7 and 8, an environment where three thing devices 100, 200, and 300 provide collaboration may be assumed, but the present embodiment is not limited thereto. In other embodiments, the infrastructure apparatus according to an embodiment may be applied to an environment where two thing devices or four or more thing devices provide collaboration.

Moreover, the thing devices 200 and 300 may include hardware elements which are the same as the thing device 100. Therefore, the description of the thing device 100 illustrated in FIGS. 3 to 6 may be applied to the thing devices 200 and 300.

First, referring to FIG. 7, in step S701, a first thing device 100 may be receive a collaboration service request message, which issues a request to perform a collaboration service, from a user 11. The collaboration service request message may be directly provided from the user 11 or may be received through the communication module 140 from the user 11 located at a long distance.

Subsequently, in step S703, the first thing device 100 may interpret the collaboration service request message so as to determine tasks necessary for performing the collaboration service requested by the user 11, an order in which the tasks are performed, and the number of thing devices necessary for performing the tasks.

Subsequently, in step S705, the first thing device 100 may search for peripheral thing devices so as to recruit thing devices capable of performing the collaboration service requested by the user 10. In detail, the first thing device 100 may generate a search query language which describes the tasks, the order in which the tasks are performed, and the number of the thing devices necessary for performing the tasks, and may distribute the generated search query language to the social network (or an overlay network).

Subsequently, in step S707, each of second and third thing devices 200 and 300 may provide experience information thereof to the first thing device 100 over the social network (or the overlay network) in response to the search query language distributed by the first thing device 100.

In a process of providing the experience information, each of the second and third thing devices 200 and 300 may provide the first thing device 100 with limited (reduced or abbreviated) experience information according to a revelation class thereof. The limited experience information may be used as a criterion for determining a thing device which is to be added to a collaboration group by the first thing device 100. For example, the second thing device 200 may provide the first thing device 100 with experience information which sufficiently describes a function and an experience of the second thing device 200, based on an assigned first revelation class, and the third thing device 300 may provide the first thing device 100 with experience information which does not sufficiently describe a function and an experience of the third thing device 300, based on a second revelation class lower than the first revelation class. In this case, the first thing device 100 may add the second thing device 200, which has provided the sufficient experience information, to the collaboration group and may exclude the third thing device 300, which has provided the insufficient experience information, from the collaboration group.

Subsequently, in step S709, the first thing device 100 may check the experience information of each of the second and third thing devices 200 and 300, and when it is determined that collaboration with the second and third thing devices 200 and 300 is necessary for the collaboration service which is to be performed by the first thing device 100, the first thing device 100 may transmit a group participation request message, which issues a request to participate in the collaboration group, to the second and third thing devices 200 and 300. At this time, the first thing device 100 may further transmit information (for example, the collaboration service perform history data 132-1, the context data 132-3, the collaboration service perform evaluation data 132-5, and the space data 132-7) which describes in detail the function and experience of the first thing device 100, along with the group participation request message.

Subsequently, in step S711, if the second and third thing devices 200 and 300 which have received the group participation request message is not in a busy state where another collaboration service is currently performed, the second and third thing devices 200 and 300 may transmit a group participation allowance message, which allows participation in the collaboration group, to the first thing device 100. At this time, each of the second and third thing devices 200 and 300 may further transmit, to the first thing device 100, information which describes in detail a function and an experience thereof such as the collaboration service perform history data 132-1, the context data 132-3, the collaboration service perform evaluation data 132-5, and the space data 132-7, along with the group participation allowance message.

Subsequently, in step S713, the first thing device 100 may generate the collaboration group including the first thing device 100 and the second and third thing devices 200 and 300 which have allowed participation in the collaboration group.

Subsequently, in step S715, the first thing device 100 may perform a function of a coordinator which recruits the second and third thing devices 200 and 300, but the present embodiment is not limited thereto. In other embodiments, after the collaboration group is generated, the coordinator may be re-selected. For example, each of the first to third thing devices 100, 200, and 300 may compare context data (for example, performance, a memory, a function, etc.) thereof with context data (for example, performance, a memory, a function, etc.) of another thing device which is shared in steps S709 and S711, and thus, may determine whether there is a thing device included in an upper class higher than a class thereof. When it is determined that each of the first to third thing devices 100, 200, and 300 is a device having an uppermost class in the collaboration group, each of the first to third thing devices 100, 200, and 300 may transmit, to another thing device, a message for performing a function of a coordinator, thereby re-selecting the coordinator. A series of procedure associated with a re-selection of the coordinator may be performed by a collaboration group management module included in a collaboration platform module of each thing device.

Hereinafter, an example where the second thing device 200 is re-selected as a coordinator through a procedure of re-selecting the coordinator may be assumed.

Referring to FIG. 8, in step S717, the second thing device 200 re-selected as the coordinator may allocate tasks to thing devices included in the collaboration group including the second thing device 200, based on tasks recognized from the search query language from the first thing device 100, an order in which the tasks are performed, and the number of thing devices necessary for performing the tasks. Hereinafter, an task allocation procedure where based on the order in which the tasks recognized from the search query language are performed, the second thing device 200 transmits a task perform request message, which issue a request to first perform an assigned task, to the first thing device 100, subsequently transmits a task perform request message, which issue a request to perform an assigned task, to the third thing device 300, and lastly performs a task assigned to the second thing device 200 may be assumed.

When the first thing device 100 completes a task assigned (allocated) to the first thing device 100 in step S719, the first thing device 100 may convert collaboration service history data and collaboration service perform evaluation data of the collaboration service performed by the first thing device 100 into knowledge information and may store the knowledge information in a collaboration knowledge base of the first thing device 100 in step S721. Here, the conversion to the knowledge information may denote that the collaboration service history data and the collaboration service perform evaluation data are converted into a schema structure defined in the collaboration knowledge base of the first thing device 100. The collaboration service history data may include, for example, a date where the collaboration service has been performed, a time taken in completing the collaboration service, and all kinds of information and data which are generated while the collaboration service is being performed. The collaboration service perform evaluation data may include all kinds of information and data associated with the quality of the collaboration service, and as a representative example, may include the number of performing fails of the collaboration service. The number of fails may be obtained at a specific period, and for example, may be obtained from the number of messages notifying that the collaboration service is not completed.

Subsequently, in step S723, the first thing device 100 may transmit a completion message, notifying that performing of a task assigned (allocated) to the first thing device 100 is completed, to the second and third thing devices 200 and 300. At this time, the first thing device 100 may transmit collaboration service history data and collaboration service perform evaluation data of the first thing device 100 to the second and third thing devices 200 and 300 along with the completion message.

Subsequently, when the third thing device 300 completes performing of a task assigned (allocated) to the third thing device 300 in step S725, the third thing device 300 may store collaboration service history data and collaboration service perform evaluation data of a collaboration service, performed by the third thing device 300, in a collaboration knowledge base of the third thing device 300 in step S727.

Subsequently, in step S729, the third thing device 300 may transmit, to the first and second thing devices 100 and 200, the collaboration service history data and collaboration service perform evaluation data of the collaboration service performed by the third thing device 300 along with a completion message notifying that performing of a task assigned (allocated) to the third thing device 300 is completed.

Subsequently, when the second thing device 200 completes performing of a task assigned (allocated) to the second thing device 200 in step S731, the second thing device 200 may store collaboration service history data and collaboration service perform evaluation data of a collaboration service, performed by the second thing device 200, in a collaboration knowledge base of the second thing device 200 in step S733.

Subsequently, in step S735, the second thing device 200 may integrate and synchronize a collaboration service history and evaluation data shared with the first and third thing devices 100 and 300 and may report a synchronized result as a collaboration service perform result to the user 11.

Although not shown, when a report of a collaboration service result is completed, the second thing device 200 may notify the first and third thing devices 100 and 300 of group dissolution, and the first and third thing devices 100 and 300 may withdraw from the collaboration group according to the group dissolution notification, whereby the collaboration group generated based on a collaboration service request of the user 11 may be automatically dissolved.

According to the embodiments of the present invention, since a plurality of thing devices located in a specific space share an experience where the plurality of thing devices have performed a collaboration service, each of the thing devices may search for peripheral thing devices for performing the collaboration service without intervention of a center server and may generate a collaboration group including the found thing devices, and tasks for performing through negotiation may be autonomously distributed to the thing devices included in the collaboration group, thereby providing autonomous collaboration between the thing devices.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing collaboration between thing devices each containing circuitry and connected to one another over a network, the method comprising:
   interpreting based on a collaboration knowledge base, by a thing device, a collaboration service requested by a user by recognizing a target of the collaboration service and subdividing the collaboration service into a plurality of tasks and determining an order in which the plurality of tasks are performed so as to achieve the recognized target to search for a plurality of peripheral thing devices each containing circuitry and together are capable of performing the plurality of tasks of the collaboration service;
   in response to the search for the plurality of peripheral thing devices, transmitting, by at least one of the plurality of peripheral thing devices, experience information describing an experience of the at least one peripheral thing device associated with the collaboration service to the thing device;

generating, by the thing device, a collaboration group including the at least one peripheral thing device, based on the experience information;

allocating, by the thing device, the tasks corresponding to the collaboration service to all of thing devices included in the collaboration group, respectively; and converting, by each of the thing devices, a result of performing of an allocated task into knowledge information to store the knowledge information in the collaboration knowledge base;

wherein the generating of the collaboration group comprises excluding, by the thing device, a peripheral thing device, which has transmitted abbreviated experience information, of the at least one peripheral thing device from the collaboration group.

2. The method of claim 1, wherein the searching comprises performing a sematic search to recruit the plurality of peripheral thing devices.

3. The method of claim 1, wherein the searching comprises generating a search query language describing a result of the interpretation of the collaboration service with words or as a sentence to distribute the search query language to the network.

4. The method of claim 1, wherein the searching comprises:

interpreting the collaboration service requested by the user, based on the collaboration knowledge base;

interpreting the collaboration service to generate a search query language which describes, with words or as a sentence, the plurality of tasks for performing the collaboration service, the order in which the plurality of tasks are performed, and a number of peripheral thing devices necessary for performing the plurality of tasks; and distributing the search query language to the network.

5. The method of claim 4, wherein the knowledge information stored in the collaboration knowledge base comprises collaboration service perform history data recording a history of a collaboration service which has been performed by the thing device, context data recording a hardware or software performance specification of the thing device, collaboration service perform evaluation data recording an evaluation of the collaboration service which has been performed by the thing device, and space data recording a description of a space where the thing device is located.

6. The method of claim 1, wherein the transmitting of the experience information comprises transmitting, by the at least one peripheral thing device, the experience information describing a function and an experience of the at least one peripheral thing device with words or as a sentence.

7. The method of claim 1, wherein the transmitting of the experience information comprises:

extracting, by at least one peripheral thing device, data associated with a function of the at least one peripheral thing device and data associated with an experience of performing a collaboration service similar to the collaboration service from the collaboration knowledge base;

learning the extracted data to generate the experience information; and transmitting the generated experience information.

8. The method of claim 7, wherein in the extracting:

the data associated with a function of the at least one peripheral thing device comprises context data recording a hardware or software performance specification of the at least one peripheral thing device and space data recording a description of a space where the at least one peripheral thing device is located, and the data associated with the experience comprises collaboration service perform history data recording a history of a collaboration service which has been performed by the at least one peripheral thing device and collaboration service perform evaluation data recording an evaluation of the collaboration service which has been performed by the at least one peripheral thing device.

9. The method of claim 1, wherein the transmitting of the generated experience information comprises:

generating the experience information, based on the knowledge information stored in the collaboration knowledge base;

limiting the generated experience information according to a previously set revelation class to abbreviate the generated experience information; and transmitting the abbreviated experience information.

10. The method of claim 9, further comprising setting the previously set revelation class, wherein the setting comprises setting the previously set revelation class, based on collaboration service perform history data and collaboration service perform evaluation data stored in the collaboration knowledge base.

11. An infrastructure apparatus for providing collaboration between thing devices each containing circuitry comprising a processor and memory and connected to one another over a network, the infrastructure apparatus comprising:

at least one of the thing devices interpreting based on a collaboration knowledge base a collaboration service requested by a user by recognizing a target of the collaboration service and subdividing the collaboration service into a plurality of tasks and determining an order in which the plurality of tasks are performed so as to achieve the recognized target to search for a plurality of peripheral thing devices each containing circuitry comprising a processor and memory and a service providing device to provide a physical function corresponding to the collaboration service, the plurality of peripheral thing devices together are capable of performing the plurality of tasks of the collaboration service; and at least one peripheral thing devices containing circuitry comprising the processor and memory and the service providing device transmitting, to the thing device, experience information describing an experience of the at least one peripheral thing device associated with the collaboration service in response to the search for the plurality of peripheral thing devices, wherein the thing device generates a collaboration group including the at least one peripheral thing device, based on the experience information and respectively allocates the tasks corresponding to the collaboration service to all of thing devices included in the collaboration group, and each of the thing devices builds the collaboration knowledge base where a result of performing of an allocated task is stored as knowledge information, and includes a storage module circuit storing the collaboration knowledge base.

12. The infrastructure apparatus of claim 11, wherein the thing device performs a sematic search to recruit the plurality of peripheral thing devices.

13. The infrastructure apparatus of claim 11, wherein the thing device comprises:
- a collaboration service interpretation module circuit interpreting the collaboration service requested by the user, based on the collaboration knowledge base;
- a processor module circuit generating a search query language which describes, with words or as a sentence, the plurality of tasks for performing the collaboration service, the order in which the plurality of tasks are performed, and a number of peripheral thing devices necessary for performing the plurality of tasks, based on a result of the interpretation of the collaboration service; and
- a communication module circuit distributing the search query language to the network.

14. The infrastructure apparatus of claim 13, wherein the knowledge information stored in the collaboration knowledge base comprises collaboration service perform history data recording a history of a collaboration service which has been performed by the thing device, context data recording a hardware or software performance specification of the thing device, collaboration service perform evaluation data recording an evaluation of the collaboration service which has been performed by the thing device, and space data recording a description of a space where the thing device is located.

15. The infrastructure apparatus of claim 11, wherein the at least one peripheral thing device comprises a communication module circuit transmitting the experience information, describing a function and an experience of the at least one peripheral thing device with words or as a sentence, to the thing device.

16. The infrastructure apparatus of claim 11, wherein the at least one peripheral thing device comprises:
- a query analysis module circuit analyzing a search query language generated by the thing device for searching for the plurality of peripheral thing devices;
- an experience information generation module circuit extracting data associated with a function of the at least one peripheral thing device and data associated with an experience of performing the collaboration service, based on a result of the analysis of the search query language and learning the extracted data to generate the experience information; and
- a communication module circuit transmitting the generated experience information to the thing device.

17. The infrastructure apparatus of claim 16, wherein the at least one peripheral thing device further comprises an information revelation management module circuit limiting the generated experience information according to a previously set revelation class to abbreviate the generated experience information.

18. The infrastructure apparatus of claim 17, wherein the previously set revelation class is set based on collaboration service perform history data and collaboration service perform evaluation data stored in the collaboration knowledge base.

19. A method of providing collaboration between thing devices each containing circuitry and connected to one another over a network, the method comprising:
- interpreting, by a thing device, a collaboration service requested by a user to search for a plurality of peripheral thing devices each containing circuitry and capable of performing the collaboration service;
- in response to the search for the plurality of peripheral thing devices, transmitting, by at least one of the plurality of peripheral thing devices, experience information describing an experience of the at least one peripheral thing device associated with the collaboration service to the thing device, wherein transmitting the experience information includes generating the experience information, based on the knowledge information stored in a collaboration knowledge base, limiting the generated experience information according to a previously set revelation class to abbreviate the generated experience information, and transmitting the abbreviated experience information;
- generating, by the thing device, a collaboration group including the at least one peripheral thing device, based on the experience information, wherein the generating of the collaboration group includes excluding, by the thing device, a peripheral thing device, which has transmitted the abbreviated experience information, of the at least one peripheral thing device from the collaboration group;
- allocating, by the thing device, different tasks corresponding to the collaboration service to all of thing devices included in the collaboration group, respectively; and
- converting, by each of the thing devices, a result of performing of an allocated task into knowledge information to store the knowledge information in a collaboration knowledge base.

* * * * *